US011652972B2

(12) United States Patent
Guizilini et al.

(10) Patent No.: US 11,652,972 B2
(45) Date of Patent: May 16, 2023

(54) SYSTEMS AND METHODS FOR SELF-SUPERVISED DEPTH ESTIMATION ACCORDING TO AN ARBITRARY CAMERA

(71) Applicant: Toyota Research Institute, Inc., Los Altos, CA (US)

(72) Inventors: Vitor Guizilini, Santa Clara, CA (US); Igor Vasiljevic, Chicago, IL (US); Rares A. Ambrus, San Francisco, CA (US); Sudeep Pillai, Santa Clara, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 442 days.

(21) Appl. No.: 16/899,906

(22) Filed: Jun. 12, 2020

(65) Prior Publication Data
US 2021/0281814 A1 Sep. 9, 2021

Related U.S. Application Data

(60) Provisional application No. 62/984,903, filed on Mar. 4, 2020.

(51) Int. Cl.
*H04N 13/128* (2018.01)
*G06N 3/08* (2023.01)
*G06T 9/00* (2006.01)
*H04N 13/271* (2018.01)
*H04N 13/261* (2018.01)
(Continued)

(52) U.S. Cl.
CPC .............. *H04N 13/128* (2018.05); *G06N 3/08* (2013.01); *G06T 9/002* (2013.01); *G06T 15/06* (2013.01); *H04N 13/261* (2018.05); *H04N 13/271* (2018.05); *H04N 2013/0081* (2013.01)

(58) Field of Classification Search
USPC ................. 382/157, 154, 106, 285; 348/135
See application file for complete search history.

(56) References Cited

U.S. PATENT DOCUMENTS 8,432,435 B2    4/2013  Ding et al.
9,225,942 B2 *  12/2015  Zhang ................ H04N 5/23238
(Continued)

OTHER PUBLICATIONS

Bresson et al, "Urban Localization with Street Views using a Convolutional Neural Network for End-to-End Camera Pose Regression" 2019 IEEE Intelligent Vehicles Symposium (IV) Jun. 9-12, 2019, pp. 1199-1204. (Year: 2019).*
(Continued)

*Primary Examiner* — Kathleen Y Dulaney
(74) *Attorney, Agent, or Firm* — Christopher G. Darrow; Darrow Mustafa PC

(57) ABSTRACT

System, methods, and other embodiments described herein relate to improving depth estimates for monocular images using a neural camera model that is independent of a camera type. In one embodiment, a method includes receiving a monocular image from a pair of training images derived from a monocular video. The method includes generating, using a ray surface network, a ray surface that approximates an image character of the monocular image as produced by a camera having the camera type. The method includes creating a synthesized image according to at least the ray surface and a depth map associated with the monocular image.

18 Claims, 9 Drawing Sheets

(51) Int. Cl.
G06T 15/06 (2011.01)
H04N 13/00 (2018.01)

(56) References Cited

U.S. PATENT DOCUMENTS

| | | | |
|---|---|---|---|
| 9,858,639 B2 | 1/2018 | Zhang et al. | |
| 10,495,512 B2 | 12/2019 | David et al. | |
| 11,034,357 B2* | 6/2021 | Lakshmi Narayanan | G06V 20/597 |
| 2014/0253722 A1* | 9/2014 | Smyth | B60R 1/00 348/135 |
| 2016/0288711 A1* | 10/2016 | Gehrke | G06V 20/58 |
| 2018/0176483 A1* | 6/2018 | Knorr | G06T 19/006 |
| 2018/0189565 A1* | 7/2018 | Lukierski | H04N 5/23238 |
| 2019/0155302 A1* | 5/2019 | Lukierski | G06T 17/00 |
| 2019/0387209 A1* | 12/2019 | Yang | H04N 13/271 |
| 2020/0014904 A1 | 1/2020 | Wetzstein et al. | |
| 2021/0201526 A1* | 7/2021 | Moloney | G06N 3/0454 |
| 2021/0213973 A1* | 7/2021 | Carillo Peña | G06T 15/08 |
| 2021/0334556 A1* | 10/2021 | Vignard | G06V 10/22 |

OTHER PUBLICATIONS

Chang et al, "Multi-View 3D Reconstruction for Scenes under the Refractive Plane with Known Vertical Direction" 2011 IEEE International Conference on Computer Vision, pp. 351-358 (Year: 2011).*
Frey et al, Explorable Volumetric Depth Images from Raycasting, 2013 XXVI Conference on Graphics, Patterns and Images, pp. 123-130 (Year: 2013).*
Grossberg et al., "A General Imaging Model and a Method for Finding Its Parameters", Proceedings Eighth IEEE International Conference on Computer Vision. ICCV 2001, Vancouver, BC, Canada, 2001, pp. 108-115 vol. 2.
Gordon et al., "Depth From Videos in the Wild: Unsupervised Monocular Depth Learning From Unknown Cameras", found at: arXiv:1904.04998v1 [cs.CV] Apr. 10, 2019.
Chen et al., "Self-Supervised Learning with Geometric Constraints in Monocular Video Connecting Flow, Depth, and Camera", found at: arXiv:1907.05820v2 [cs.CV] Sep. 9, 2019.
Bergamasco et al., "Parameter-free Lens Distortion Calibration of Central Cameras", 2017 IEEE International Conference on Computer Vision (ICCV), Venice, 2017, pp. 3847-3855.
Zhou et al. "Unsupervised Learning of Depth and Ego-Motion from Video", found at: arXiv:1704.07813v2 [cs.CV] Aug. 1, 2017.
Ying et al. "Can We Consider Central Catadioptric Cameras and Fisheye Cameras Within a Unified Imaging Model", Computer Vision—ECCV 2004. ECCV 2004. Lecture Notes in Computer Science, vol. 3021.
Kannala et al. "A Generic Camera Model and Calibration Method for Conventional, Wide-Angle, and Fish-Eye Lenses", IEEE Transactions on Pattern Analysis and Machine Intelligence, vol. 28, No. 8, pp. 1335-1340, Aug. 2006.
He et al., "Deep Residual Learning for Image Recognition", found at: arXiv:1512.03385v1 [cs.CV] Dec. 10, 2015.
Godard et al., "Digging Into Self-Supervised Monocular Depth Estimation", found at: arXiv:1806.01260v4 [cs.CV] Aug. 17, 2019.
Pillai et al., "SuperDepth: Self-Supervised, Super-Resolved Monocular Depth Estimation", found at: arXiv:1810.01849v1 [cs.CV] Oct. 3, 2018.
Wu et al., "Group Normalization", In ECCV (pp. 3-19), Jun. 2018.
Geiger et al., "Vision meets Robotics: The KITTI Dataset", International Journal of Robotics Research, 32, 1231-1237 (2013).
Shi et al.,"Real-Time Single Image and Video Super-Resolution Using an Efficient Sub-Pixel Convolutional Neural Network", found at: arXiv:1609.05158v2 [cs.CV] Sep. 23, 2016.
Srivastava et al., "Dropout: A Simple Way to Prevent Neural Networks from Overfitting", Journal of Machine Learning Research 15, 1929-1958 (2014).
Godard et al., "UnsupervisedMonocular Depth Estimation with Left-Right Consistency", found at: arXiv:1609.03677v3 [cs.CV] Apr. 12, 2017.
Casser at al., "Depth prediction without the sensors: Leveraging structure for unsupervised learning from monocular videos", found at: arXiv:1811.06152v1 [cs.CV] Nov. 15, 2018.
Eigen et al., "Depth map prediction from a single image using a multi-scale deep network", found at: arXiv:1406.2283v1 [cs.CV] Jun. 9, 2014.
Garg et al., "Unsupervised cnn for single view depth estimation: Geometry to the rescue", found at: arXiv:1603.04992v2 [cs.CV] Jul. 29, 2016.
Jaderberg et al., "Spatial transformer networks", In Advances in neural information processing systems, pp. 2017-2025, 2015.
Kingma et al., "Adam: A method for stochastic optimization" found at: arXiv:1412.6980v1 [cs.LG] Dec. 22, 2014.
Mahjourian et al., "Unsupervised learning of depth and ego-motion from monocular video using 3d geometric constraints", In Proceedings of the IEEE Conference on Computer Vision and Pattern Recognition, pp. 5667-5675, 2018.
Brousseau et al., "Calibration of axial sheye cameras through generic virtual central models", In: Proceedings of the IEEE International Conference on Computer Vision. pp. 4040-4048 (2019).
Zhou et al., Unsupervised learning of monocular depth estimation with bundle adjustment, super-resolution and clip loss, arXiv preprint arXiv:1812.03368, 2018.
Yang et al., "Every pixel counts: Unsupervised geometry learning with holistic 3d motion understanding", In European Conference on Computer Vision, pp. 691-709. Springer, 2018.
Wang et al., "Image quality assessment: from error visibility to structural similarity", in IEEE transactions on image processing, 13(4):600-612, 2004.
Paszke et al., "Automatic differentiation in pytorch", in 31st Conference on Neural Information Processing Systems (NIPS 2017).
Kolesnikov, et al., "Revisiting selfsupervised visual representation learning", found at: arXiv:1901.09005v1 [cs.CV] Jan. 25, 2019.
Bogdan et al., "Deepcalib: a deep learning approach for automatic intrinsic calibration of wide field-of-view cameras", In: Proceedings of the 15th ACM SIGGRAPH European Conference on Visual Media Production. pp. 1-10 (2018).
Chang et al., "Deep optics for monocular depth estimation and 3d object detection", found at: arXiv:1904.08601v1 [cs.CV] Apr. 18, 2019.
Guizilini et al., "3d packing for selfsupervised monocular depth estimation", found at: arXiv:1905.02693v4 [cs.CV] Mar. 28, 2020.
Guizilini et al., "Semantically-guided representation learning for self-supervised monocular depth" found at: arXiv:2002.12319v1 [cs.CV] Feb. 27, 2020.
Li et al., "Learning fine-scaled depth maps from single rgb images", found at: arXiv:1607.00730v2 [cs.CV] Feb. 7, 2017.
Mittal, et al., "Just go with the Flow: Self-supervised scene flow estimation", found at: arXiv:1912.00497v1 [cs.CV] Dec. 1, 2019.
Pless et al., "Using many cameras as one", In: 2003 IEEE Computer Society Conference on Computer Vision and Pattern Recognition, 2003 Proceedings vol. 2, IEEE (2003).
Ramalingam et al., "A unifying model for camera calibration", IEEE Transactions on Pattern Analysis and Machine Intelligence. Institute of Electrical and Electronics Engineers, 2017, 39 (7), pp. 1309-1319.
Ramalingam et al.,"Towards generic self-calibration of central cameras", In: Computer Vision and Image Understanding (2005).
Ramalingam et al.,"Generic self-calibration of central cameras", Computer Vision and Image Understanding (2009).
Lopez-Antequera et al., "Deep single image camera calibration with radial distortion" in: Proceedings of the IEEE Conference on Computer Vision and Pattern Recognition. pp. 11817{11825 (2019).
Roy et al., "Monocular depth estimation using neural regression forest", Conference on Computer Vision and Pattern Recognition (CVPR) (2016).
Schonbein et al., "Omnidirectional 3d reconstruction in augmented manhattan worlds" In: 2014 IEEE/RSJ International Conference on Intelligent Robots and Systems. pp. 716{723. IEEE (2014).

(56) References Cited

OTHER PUBLICATIONS

Schops et al., "Why having 10,000 parameters in your camera model is better than twelve" found at: http://openaccess.thecvf.com/content_CVPR_2020/papers/Schops_Why_Having_10000_Parameters_in_Your_Camera_Model_Is_Better_CVPR_2020_paper.pdf (2020).

Vedula et al., "Three-Dimensional Scene Flow", 7th International Conference on Computer Vision (1999).

Vijayanarasimhan et al., "Sfmnet:Learning of structure and motion from video", found at: arXiv:1704.07804v1 [cs.CV] Apr. 25, 2017.

Wang et al., "Designing deep networks for surface normal estimation", found at: arXiv:1411.4958v1 [cs.CV] Nov. 18, 2014.

Wang et al., "Pseudo-lidar from visual depth estimation: Bridging the gap in 3d object detection for autonomous driving", found at: arXiv:1812.07179v2 [cs.CV] Jan. 18, 2019.

Workman et al., "Deepfocal: A method for direct focal length estimation", in: 2015 IEEE International Conference on Image Processing (ICIP). pp. 1369-1373. IEEE (2015).

Wu et al., "PointPWC-net: A coarse-to-fine network for supervised and self-supervised scene ow estimation on 3d point clouds", found at: arXiv:1911.12408v1 [cs.CV] Nov. 27, 2019.

Yang et al., "Unsupervised learning of geometry with edge-aware depth-normal consistency" found at: arXiv:1711.03665v1 [cs.CV] Nov. 10, 2017.

Zhan et al., "Unsupervised learning of monocular depth estimation and visual odometry with deep feature reconstruction" found at: http://openaccess.thecvf.com/content_cvpr_2018/papers/Zhan_Unsupervised_Learning_of_CVPR_2018_paper.pdf.

Zhan et al., "Self-supervised learning for single view depth and surface normal estimation", found at: arXiv:1903.00112v1 [cs.CV] Mar. 1, 2019.

Zhang et al., "Benefit of large field-of-view cameras for visual odometry", in: 2016 IEEE International Conference on Robotics and Automation (ICRA). pp. 801{808. IEEE (2016).

Sturm et al., "On Calibration, Structure from Motion and Multi-View Geometry for Generic Camera Models", found at: https://hal.inria.fr/inria-00387129/document (2011).

Beck et al., "Generalized b-spline camera model", in: 2018 IEEE Intelligent Vehicles Symposium (IV). pp. 2137{2142. IEEE (2018).

Rosebrock et al., "Generic camera calibration and modeling using spline surfaces", in: 2012 IEEE Intelligent Vehicles Symposium. pp. 51{56. IEEE (2012).

* cited by examiner

SYSTEMS AND METHODS FOR SELF-SUPERVISED DEPTH ESTIMATION ACCORDING TO AN ARBITRARY CAMERA

CROSS-REFERENCE TO RELATED APPLICATIONS

This application claims benefit of U.S. Provisional Application No. 62/984,903, filed on, Mar. 4, 2020, which is herein incorporated by reference in its entirety.

TECHNICAL FIELD

The subject matter described herein relates, in general, to systems and methods for determining depths of a scene from a monocular image, and, more particularly, to using a neural camera model to enable depth and pose learning according to camera images from an arbitrary camera source.

BACKGROUND

Various devices that operate autonomously or that provide information about a surrounding environment often use sensors that facilitate perceiving obstacles and additional aspects of the surrounding environment. As one example, a robotic device uses information from the sensors to develop awareness of the surrounding environment in order to navigate through the environment and avoid hazards. In particular, the robotic device uses the perceived information to determine a 3-D structure of the environment so that the device may distinguish between navigable regions and potential hazards. The ability to perceive distances using sensor data provides the robotic device with the ability to plan movements through the environment and generally improve situational awareness about the environment.

In one approach, the robotic device may employ monocular cameras to capture images of the surrounding environment; however, the captured images do not explicitly include depth information. Instead, the robotic device can implement processing routines that derive depth information from the monocular images. Approaches to deriving depth information from monocular images, however, generally rely on various assumptions that can limit the application of this approach. For example, learning-based depth and pose estimation algorithms generally focus on pinhole camera models, because of the ease of calibrating such models and the closed-form solutions for reconstruction and projection operations. Thus, sources of training data are limited to cameras of this limited set, thereby limiting the approach overall.

Moreover, advantages of other types of cameras (e.g., more comprehensive views) cannot be easily leveraged within the self-supervised depth estimation context because of difficulties with modeling such types of cameras. Thus, certain types of cameras, such as fisheye and catadioptric cameras, are generally only used in geometric applications where there is no learning and camera model parameters are obtained from careful calibration. Consequently, difficulties persist with applying self-supervised monocular depth estimation in a robust context.

SUMMARY

In one embodiment, example systems, and methods relate to an improved approach to generating depth estimates from monocular images using a neural camera model that is independent of a camera type. As previously noted, deriving depth data from monocular images may encounter various difficulties due to limitations on the source of the camera images. That is, because of various difficulties with modeling certain camera types (e.g., fisheye, catadioptric, etc.), self-supervised monocular depth estimation generally focuses on images from pinhole types of cameras while avoiding images from other types of cameras. However, this limitation compounds in that the trained models are then only useful with pinhole cameras, thereby limiting possible implementations with other camera types.

Therefore, in one embodiment, a depth system is disclosed that improves the training of a depth model by implementing a non-parametric camera model within a training architecture to permit learning of arbitrary camera types within a self-supervised context. By implementing the training architecture to account for any type of camera (e.g., catadioptric, fisheye, pinhole, etc.) as the source of images, the depth system improves the scalability of the depth model and associated pose model, which can now leverage data from multiple cameras of any sort. For example, different cameras have different advantages, such as fisheye cameras with a larger field of view increasing the area covered by the image, and catadioptric cameras that have 360-degree field coverage of the surroundings, which can be particularly useful for autonomous driving scenarios with the comprehensive information included therein. Thus, the depth system may then leverage information from a wider variety of sources to improve knowledge about the surroundings, and, in the context of an autonomous vehicle, improve navigation of the vehicle through the environment. In this way, the depth system applies a self-supervised approach to training a depth model for monocular depth estimation using an arbitrary camera.

In one embodiment, a depth system is disclosed for improving depth estimates for monocular images using a neural camera model that is independent of a camera type. The depth system includes one or more processors and a memory communicably coupled to the one or more processors. The memory stores a ray module including instructions that when executed by the one or more processors cause the one or more processors to receive a monocular image from a pair of training images derived from a monocular video. The ray module also includes instructions to generate, using a ray surface network, a ray surface that approximates an image character of the monocular image as produced by a camera with a defined type. The training module includes instructions to create a synthesized image according to at least the ray surface and a depth map associated with the monocular image.

In one embodiment, a non-transitory computer-readable medium is disclosed for improving depth estimates for monocular images using a neural camera model that is independent of a camera type and including instructions that when executed by one or more processors cause the one or more processors to perform various functions. The instructions include instructions to receive a monocular image from a pair of training images derived from a monocular video. The instructions include instructions to generate, using a ray surface network, a ray surface that approximates an image character of the monocular image as produced by a camera with a defined type. The instructions include instructions to create a synthesized image according to at least the ray surface and a depth map associated with the monocular image.

In one embodiment, a method for improving depth estimates for monocular images using a neural camera model that is independent of a camera type is disclosed. The method includes receiving a monocular image from a pair of training images derived from a monocular video. The method includes generating, using a ray surface network, a ray surface that approximates an image character of the monocular image as produced by a camera having the camera type. The method includes creating a synthesized image according to at least the ray surface and a depth map associated with the monocular image.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
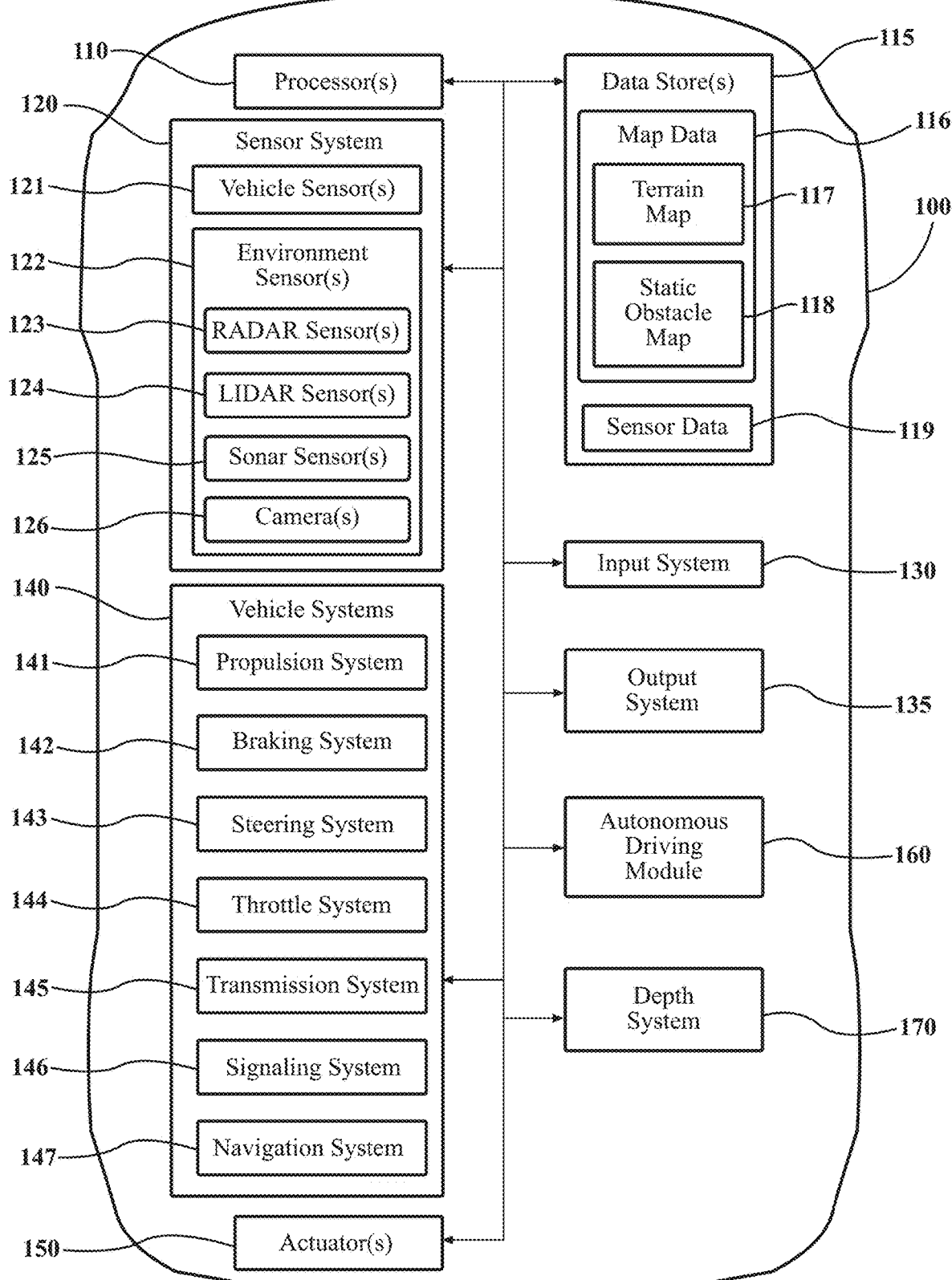
FIG. 1 illustrates one embodiment of a vehicle within which systems and methods disclosed herein may be implemented.

Systems, methods, and other embodiments associated with an improved approach to generating depth estimates from monocular images using a camera model that is independent of a camera type are disclosed. As previously noted, deriving depth data from monocular images may encounter various difficulties due to limitations of the source of the camera images. That is, because various camera types (e.g., fisheye, catadioptric, etc.) can be difficult to accurately model, self-supervised monocular depth estimation generally focuses on images from pinhole types of cameras while avoiding images from other types of cameras. However, training a depth model for a pinhole camera results in the depth model only finding uses in instances where a pinhole camera is desirable, thereby limiting possible implementations with other camera types.

Therefore, in one embodiment, a depth system is disclosed that improves the training of a depth model by implementing a non-parametric camera model within a training architecture to permit learning of arbitrary camera types within a self-supervised context. By implementing the training architecture to be independent of a camera type, the depth system improves the scalability of the depth model and associated pose model. Thus, the depth system may leverage information from a wider variety of sources and without specific manual calibration or other tuning of the training architecture.

To achieve the noted improvements, the depth system implements the training architecture to simultaneously learn a neural camera model associated with source images along with training the depth model and the pose model. This is in contrast to using a complex calibration process or manually determining parameters of a camera configuration as may occur otherwise. Accordingly, in one or more approaches, the depth system implements a neural camera model that is embodied by at least a ray surface network that accepts a monocular image as an input and produces a ray surface as an output that approximates an image character of the image. The depth system further provides the same monocular image to the depth model while providing an additional training image along with the original image to the pose model.

While the depth model produces depth estimates (i.e., a depth map) for pixels in the image, the ray surface network generates the ray surface. The ray surface associates pixels within the monocular image with directions in an environment from which light that generates the pixels in the camera originates. As one example, in the instance of a fisheye camera, the ray surface generally approximates a strong hemispherical distortion around the edges of the image that corresponds with such a camera type by defining rays or vectors pointing in a general direction of the locations in the environment.

In any case, the ray surface network functions to provide a ray surface as, in one embodiment, an approximation of the image character of the monocular image. That is, the ray surface is, in general, an approximation of how the camera manipulates light relative to actual locations in the environment to form the images. Thus, the ray surface network is broadly functioning to learn aspects associated with the source camera. Accordingly, the depth system may use the ray surface to synthesize an image in combination with a depth map from the depth model and a transform from the pose model. In one approach, the depth system uses the ray surface to lift the pixels by scaling vectors from the ray surface according to associated depth estimates. The depth system projects the resulting lifted 3D points to form the synthesized image.

The depth system may implement the projecting operation via a patch-based data association that involves defining a search grid around a target pixel and searching over the grid using a softmax approximation. In any case, the depth system implements the neural camera model via the noted operations to facilitate synthesizing the image independently of prior knowledge of the source camera. The depth system then uses the synthesized image as an input to a loss function that provides a loss value in relation to the original image. Accordingly, the depth system may backpropagate the loss value through the ray surface network, the depth model, and the pose model to train the respective models in a self-supervised manner. In this way, the depth system applies a self-supervised approach to training the models for monocular depth estimation using a camera model that is independent of the image source.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, observes surroundings to provide determinations therefrom, and thus benefits from the functionality discussed herein. In yet further embodiments, the vehicle 100 may be a statically mounted device, an embedded device, or another device that uses monocular images to derive depth information about a scene instead of being a motive device.

In any case, the vehicle 100 also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), etc.).

Some of the possible elements of the vehicle 100 are shown in FIG. 1 and will be described along with subsequent figures. However, a description of many of the elements in FIG. 1 will be provided after the discussion of FIGS. 2-9 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In any case, the vehicle 100 includes a depth system 170 that functions to train a depth model and provide depth estimates for an environment using the depth model. Moreover, while depicted as a standalone component, in one or more embodiments, the depth system 170 is integrated with the autonomous driving module 160, the camera 126, or another component of the vehicle 100. Additionally, as noted previously, one or more components of the depth system 170 may be cloud-based elements that are remote from the vehicle 100. The noted functions and methods will become more apparent with a further discussion of the figures.

Figure 2:
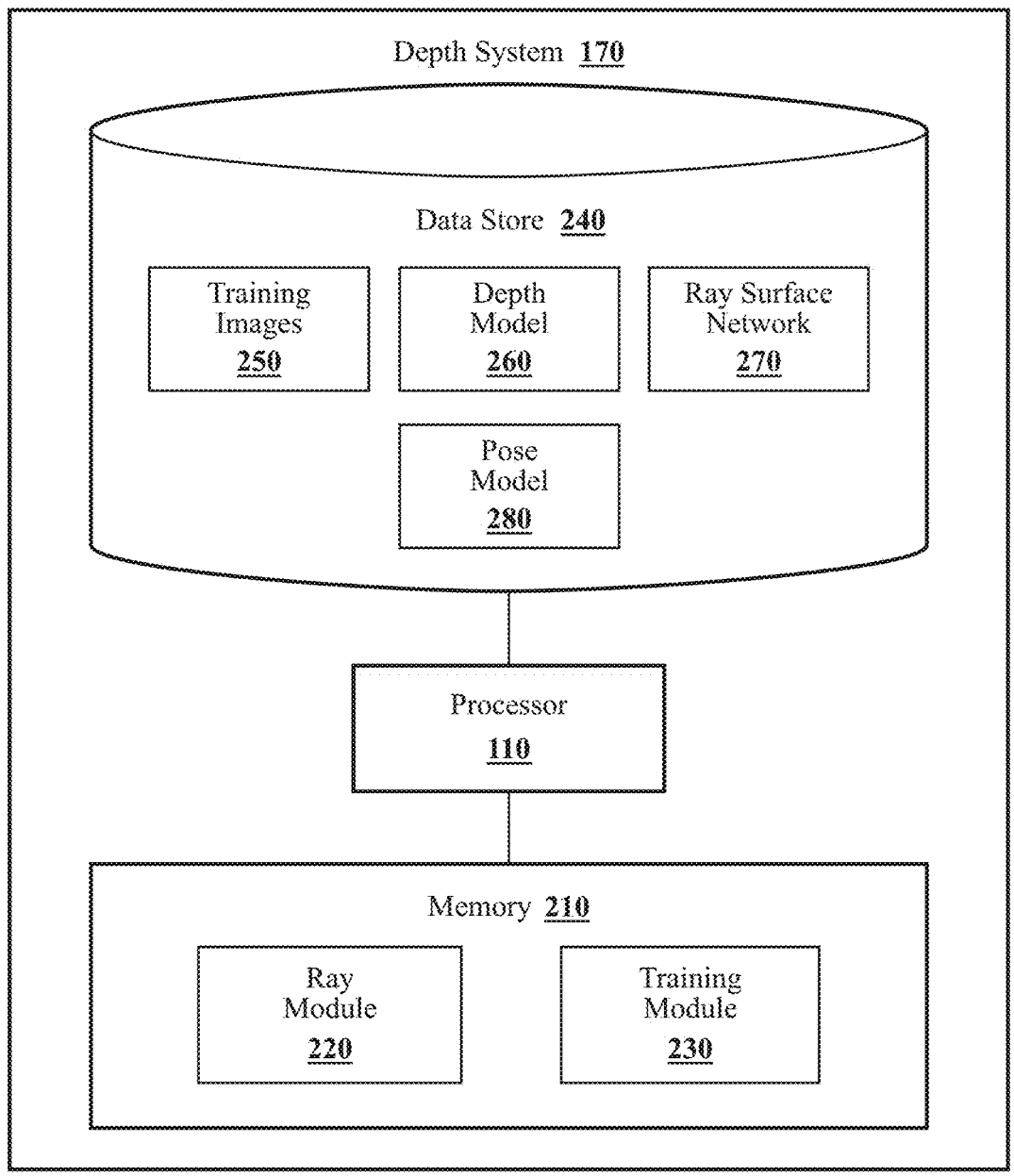
FIG. 2 illustrates one embodiment of a depth system that is associated with training a depth model for monocular depth estimation within a self-supervised context using an arbitrary camera model.

With reference to FIG. 2, one embodiment of the depth system 170 is further illustrated. The depth system 170 is shown as including a processor 110. Accordingly, the processor 110 may be a part of the depth system 170, or the depth system 170 may access the processor 110 through a data bus or another communication path. In one or more embodiments, the processor 110 is an application-specific integrated circuit (ASIC) that is configured to implement functions associated with a ray module 220 and a training module 230. In general, the processor 110 is an electronic processor, such as a microprocessor that is capable of performing various functions as described herein. In one embodiment, the depth system 170 includes a memory 210 that stores the ray module 220 and the training module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that, when executed by the processor 110, cause the processor 110 to perform the various functions disclosed herein.

Furthermore, in one embodiment, the depth system 170 includes a data store 240. The data store 240 is, in one embodiment, an electronic data structure stored in the memory 210 or another data store, and that is configured with routines that can be executed by the processor 110 for analyzing stored data, providing stored data, organizing stored data, and so on. Thus, in one embodiment, the data store 240 stores data used by the modules 220 and 230 in executing various functions. For example, as depicted in FIG. 2, the data store 240 includes training image(s) 250, a depth model 260, a ray surface network 270, and a pose model 280 along with, for example, other information that is used by the modules 220 and 230.

The training images 250 are, for example, monocular images from the camera 126 or another imaging device. The training images 250 are generally derived from one or more monocular videos that are comprised of a plurality of frames. As described herein, monocular images that comprise the training images 250 are, for example, images from the camera 126 or another imaging device that are part of a video, and that encompasses a field-of-view (FOV) about the vehicle 100 of at least a portion of the surrounding environment. That is, the monocular image is, in one approach, generally limited to a subregion of the surrounding environment. As such, the image may be of a forward-facing (i.e., the direction of travel) 60, 90, 120-degree FOV, a rear/side facing FOV, or some other subregion as defined by the imaging characteristics (e.g., lens distortion, FOV, etc.) of the camera 126. In various aspects, the camera 126 is a pinhole camera, a fisheye camera, a catadioptric camera, or another form of camera that acquires images without a specific depth modality.

The individual monocular image itself includes visual data of the FOV that is encoded according to an imaging standard (e.g., codec) associated with the camera 126 or another imaging device that is the source. In general, characteristics of a source camera (e.g., camera 126) and the video standard define a format of the monocular image. Thus, while the particular characteristics can vary according to different implementations, in general, the image has a defined resolution (i.e., height and width in pixels) and format. Thus, for example, the monocular image is generally an RGB visible light image. In further aspects, the monocular image can be an infrared image associated with a corresponding infrared camera, a black/white image, or another suitable format as may be desired. Whichever format that the depth system 170 implements, the image is a monocular image in that there is no explicit additional modality indicating depth nor any explicit corresponding image from another camera from which the depth can be derived (i.e., no stereo camera pair). In contrast to a stereo image that may integrate left and right images from separate cameras mounted side-by-side to provide an additional depth channel, the monocular image does not include explicit depth information, such as disparity maps derived from comparing the stereo images pixel-by-pixel. Instead, the monocular image implicitly provides depth information in the relationships of perspective and size of elements depicted therein from which the depth model 260 derives the depth map/estimates.

Moreover, the monocular video(s) from which the training images 250 are derived may include observations of many different scenes. That is, as the camera 126 or another original source camera of the video progresses through an environment, perspectives of objects and features in the environment change, and the depicted objects/features themselves also change, thereby depicting separate scenes (i.e., particular combinations of objects/features). Thus, the depth system 170 may extract particular training pairs of monocular images from the monocular video for training. In particular, the depth system 170 generates the pairs from the video so that the pairs of images are of the same scene. As should be appreciated, the video includes a series of monocular images that are taken in succession according to a configuration of the camera. Thus, the camera may generate the images (also referred to herein as frames) of the video at regular intervals, such as every 0.033 s. That is, a shutter of the camera operates at a particular rate (i.e., frames-per-second (fps) configuration), which may be, for example, 24 fps, 30 fps, 60 fps, etc.

For purposes of the present discussion, the fps is presumed to be 30 fps. However, it should be appreciated that the fps may vary according to a particular configuration. Moreover, the depth system 170 need not generate the pairs from successive ones (i.e., adjacent) of images in a video, but instead can generally pair separate images of the same scene that are not successive as training images. Thus, in one approach, the depth system 170 pairs every other image depending on the fps. In a further approach, the depth system pairs every fifth image as a training pair. The greater the timing difference in the video between the pairs, the more pronounced a difference in camera position; however, this may also result in fewer shared features/objects between the images. As such, as previously noted, the pairs of training images 250 are of a same scene and are generally constrained, in one or more embodiments, to be within a defined number of frames (e.g., 5 or fewer) to ensure correspondence of an observed scene between a pair of the training images 250. In any case, the pairs of training images 250 generally have attributes of being monocular images from a monocular video that are separated by some interval of time (e.g., 0.06 s) such that a perspective of the camera changes between the pair of training images as a result of motion of the camera through the environment while generating the video.

Figure 3:
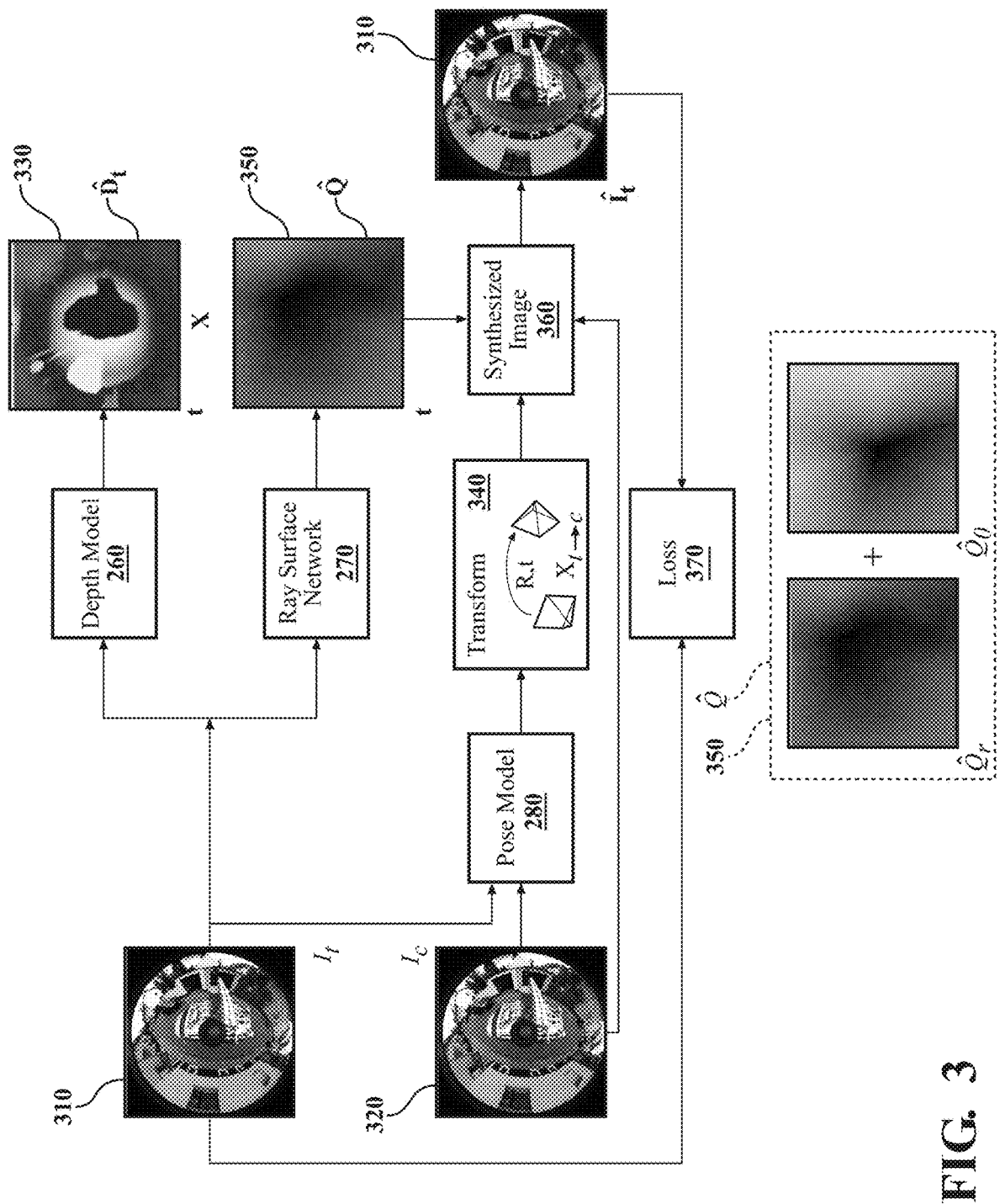
FIG. 3 illustrates a diagram of one embodiment of a training architecture.

Further detail about the depth model 260, the ray surface network 270, the pose model 280, and further components of the depth system 170 will be provided in relation to FIG. 3 and subsequent figures. Thus, with reference to FIG. 3, one embodiment of a training architecture 300 associated with the depth system 170 is shown. As illustrated in FIG. 3, the training architecture 300 includes the depth model 260, the ray surface network 270, and the pose model 280 as implemented via the depth system 170. A training image pair including monocular image 310 and 320 from the training images 250 are provided as inputs to the separate components. For example, the monocular image 310 is provided to all of the noted components, while the monocular image 320 is provided to the pose model 280.

In any case, the training module 230 includes instructions to apply the depth model 260 to the image 310 in order to generate the depth map 330. The depth model 260, as illustrated in detail in FIG. 4A, identifies an exemplary flow of a processing channel formed by the depth model 260 for processing monocular images, such as the training images 250. It should be appreciated that the depth model 260 is generally a machine learning algorithm that may be broadly characterized as a convolutional neural network (CNN) or as an encoder/decoder architecture, including convolutional and deconvolutional components.

The monocular image 310 is provided as an input into the depth model 260. The depth model 260, in one embodiment, includes an encoder 400 that accepts the image 310 as an electronic input and processes the image 310 to extract depth features. It should be appreciated that while the depth model 260 is discussed as a separate, distinct component, in one or more approaches, the depth model 260 is integrated with the ray module 220 and/or the training module 230. Thus, the modules 220/230 may implement various routines/functions of the model 260 while storing data values (e.g., weights) of the depth model 260 in the data store 240.

In any case, the depth features are, in general, aspects of the image that are indicative of spatial information that is intrinsically encoded therein. One example of an architecture for the encoding layers that form the encoder 400 may include a series of layers that function to fold (i.e., adapt dimensions of the feature map to retain the features) encoded features into separate channels iteratively reducing spatial dimensions of the image 250 while packing additional channels with information about embedded states of the features. The addition of the extra channels avoids the lossy nature of the encoding process and facilitates the preservation of more information (e.g., feature details) about the original monocular image 310.

Accordingly, in at least one approach, the encoder 400 is comprised of multiple encoding layers formed from a combination of two-dimensional (2D) convolutional layers, packing blocks, and residual blocks. While the encoder 400 is presented as including the noted components, it should be appreciated that further embodiments may vary the particular form of the encoding layers (e.g., convolutional and pooling layers without packing layers), and thus the noted configuration is one example of how the depth system 170 may implement the depth model 260.

The separate encoding layers generate outputs in the form of encoded feature maps (also referred to as tensors), which the encoding layers provide to subsequent layers in the depth model 260, including specific layers of a decoder 410 via skip connections that may function to provide residual information between the encoder and the decoder 410. Thus, the encoder 400 includes a variety of separate layers that operate on the monocular image 310, and subsequently on derived/intermediate feature maps that convert the visual information of the monocular image 310 into embedded state information in the form of encoded features of different channels. In any case, the output of the encoder 400 is, in one approach, a feature map having a particular dimension (e.g., 512×H/32×W/32) that is transformed in relation to the image 310 (e.g., 3×H×W).

Figure 4A:
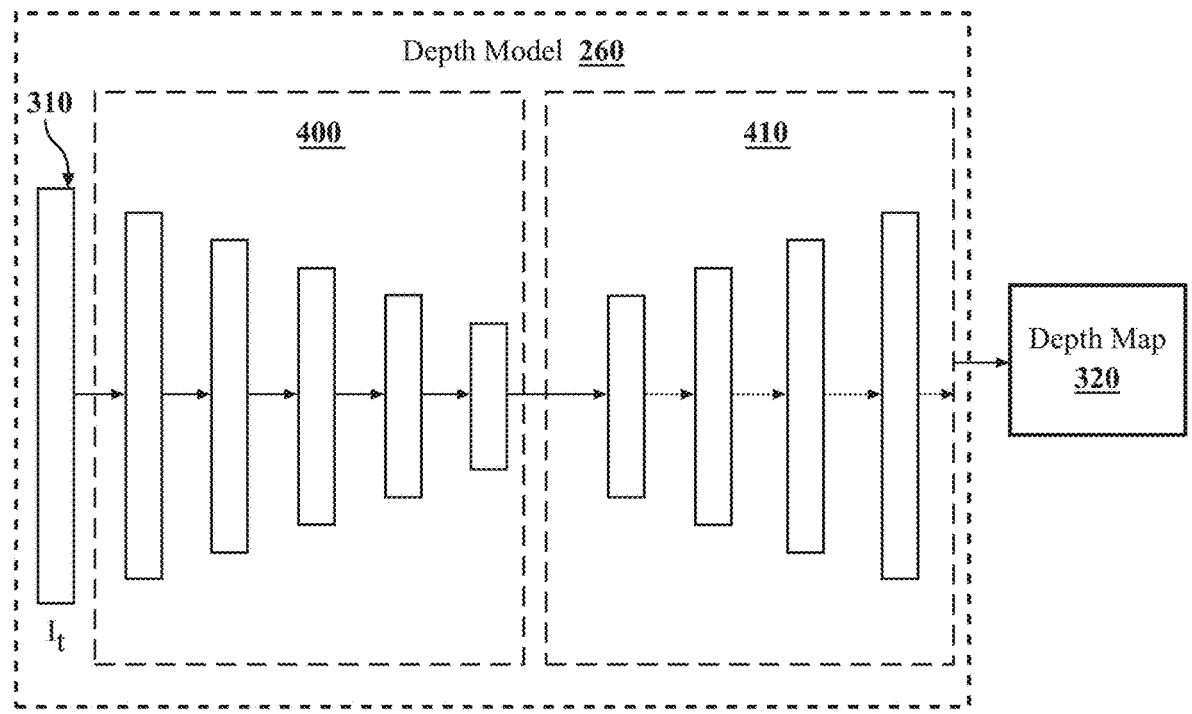
FIG. 4A illustrates a diagram of one embodiment of a depth model.
Figure 4B:
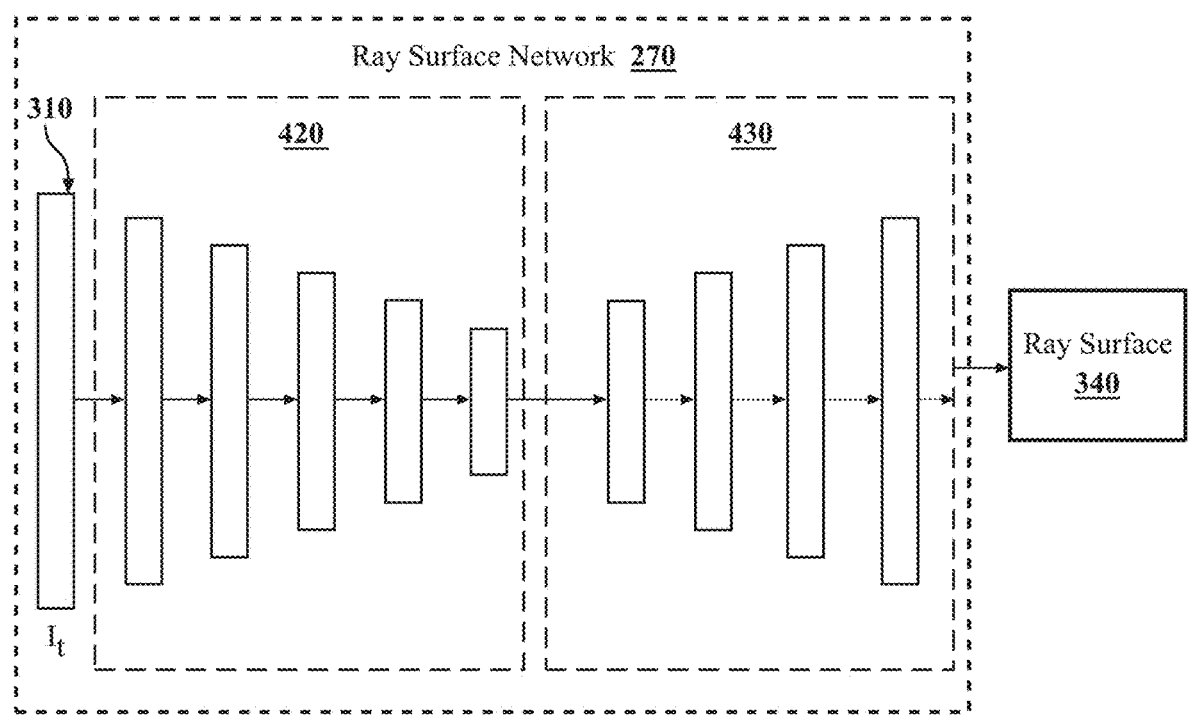
FIG. 4B illustrates a diagram of one embodiment of a ray surface network.

With continued reference to FIG. 4A, the depth model 260 further includes the decoder 410. One example of how the decoder 410 functions includes unfolding (i.e., adapting dimensions of the tensor to extract the features) the previously encoded spatial information in order to derive the depth map 330 according to learned correlations associated with the encoded features. That is, the decoding layers generally function to up-sample, through sub-pixel convolutions and other mechanisms, the previously encoded features into the depth map 330. In one or more arrangements, the decoding layers comprise unpacking blocks, two-dimensional convolutional layers, and inverse depth layers that function as output layers for different scales. In further aspects, the decoder 410 may also receive inputs via guiding connections from another model, such as identification of different instances within the image 310 from a semantic segmentation model that further guides determinations of the depths. While the decoder 410 is presented as including the noted components, it should be appreciated that further arrangements may vary the particular form of the decoding layers (e.g., deconvolutional layers without unpacking layers), and thus the noted configuration is one example of how the depth system 170 may implement the decoder 410.

In any case, returning to FIGS. 2 and 3, the depth system 170, in one embodiment, employs the depth model 260 to produce the depth map 330, which, in one or more arrangements, may be provided as an inverse mapping having inverse values for the depth estimates. In general, however, the depth map 330 is a pixel-wise prediction of depths for the image 310. That is, the depth model 260 provides estimates of depths for different aspects depicted in the image 310. It should be appreciated that, in one embodiment, the training module 230 generally includes instructions that function to control the processor 110 to execute various actions to control the depth model 260 to produce the depth map 330. The training module 230, in one or more approaches, acquires the image 250 by controlling the camera 126 to capture the image 250 via passively receiving the image from a data bus, or electronic memory, or another available communication pathway. Thus, the training images 250 may be actively acquired or may be predefined and stored in the data store 240.

Figure 5:
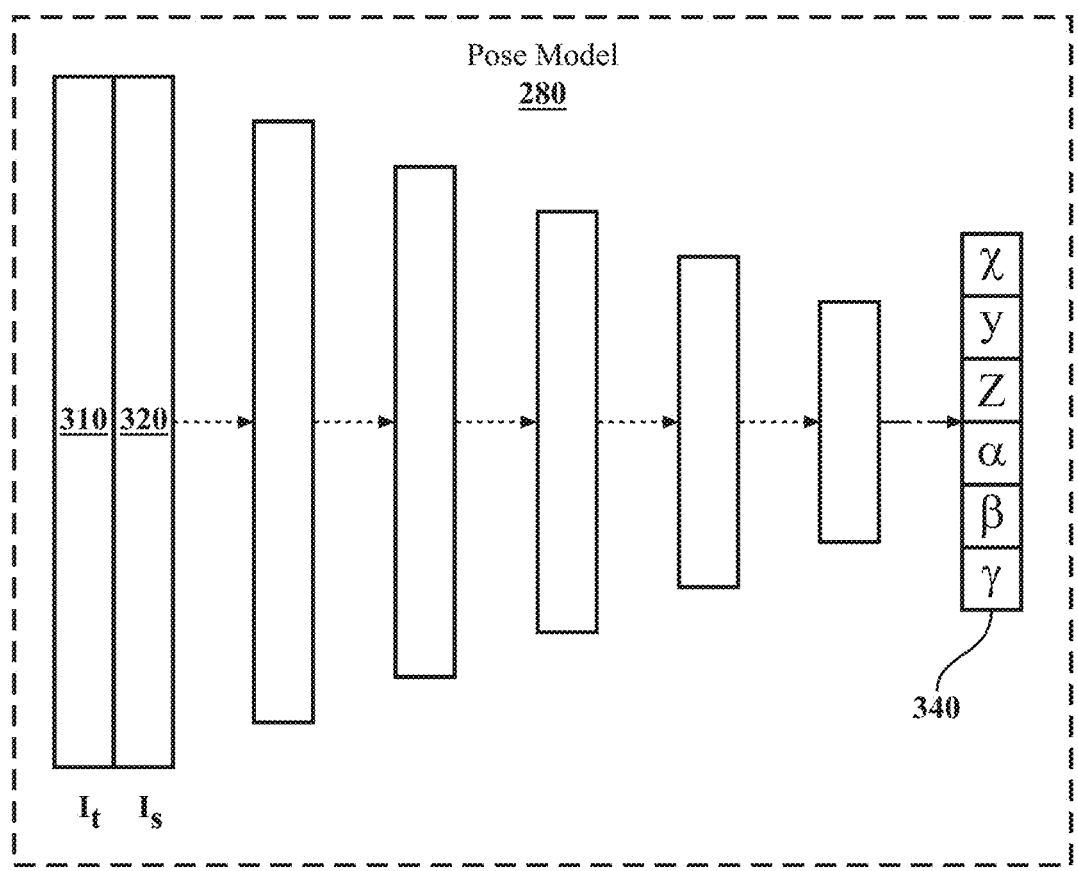
FIG. 5 illustrates one embodiment of a pose model.

In addition to providing the image 310 to the depth model 260, the training module 230 also provides the image 310 to the pose model 280 along with a second image 320 of a training pair. As previously outlined, the training pair are images of a same scene derived from a monocular video but taken apart in time as the source camera moves through the environment so that the images 310/320 have slightly different perspectives of the same scene. The pose model 280 is, in one or more embodiments, a machine learning algorithm that generates a rigid-body transformation 340 according to the noted images. An additional diagram of the pose model 280 is illustrated in FIG. 5. As shown in FIG. 5, the pose network 280 is, for example, a convolutional neural network that is comprised of a series of convolutional and average pooling layers. In one embodiment, the pose model 280 is comprised of seven convolutional layers followed by a final one-by-one convolutional layer and a six-channel average pooling operation. Of course, the noted configuration is one example of how the pose model 280 may be implemented, and, in further approaches, the pose model 280 may include a different combination of layers. The input to the pose model 280 includes the image 310 (target image), and a context image 320 that may be concatenated together as a single input. The training module 230, in at least one approach, uses the transformation 340 in combination with the ray surface 350 and the depth map 330 to produce the synthesized image 360, as will be discussed in greater detail subsequently.

Accordingly, the ray module 220 includes instructions to control the ray surface network 270 to generate the ray surface 350. The ray surface network 270 is, in one or more approaches, a machine learning algorithm. As further detailed in FIG. 4B, the ray surface network 270 includes an encoder/decoder architecture with an encoder 420 and a decoder 430. The configuration of the encoder 420, in one or more approaches, may be similar to the encoder 400 of the depth model 260. Thus, in one or more arrangements, instead of the depth model 260 and the ray surface network 270, including separate encoders 400 and 420, the model 260 and the network 270 may share a single encoder (e.g., encoder 400). In general, the encoder 420 includes encoding layers arranged in a series of layers that function to reduce spatial dimensions of the image 310 into representations about embedded states of features included in the image 310.

Accordingly, in at least one approach, the encoder 420 is comprised of multiple encoding layers formed from a combination of two-dimensional (2D) convolutional layers, packing blocks, residual blocks, pooling layers, and so on. While the encoder 420 is presented as including the noted components, it should be appreciated that further embodiments may vary the particular form of the encoding layers, and thus the noted configuration is one example of how the depth system 170 may implement the ray surface network 270.

The ray surface network 270 further includes the decoder 430. In one example, the decoder 430 includes decoding layers that generally function to up-sample, through sub-pixel convolutions and other mechanisms, the previously encoded features into the ray surface 350. In one or more arrangements, the decoding layers comprise two-dimensional deconvolutional layers and other components as implemented to generate the ray surface 350. In any case, the ray surface network 270 produces the ray surface 350 according to an input of the image 310 in order to approximate an image character of the image 310. For example, the image character of the image 310 generally relates to a type of the source camera (e.g., camera 126) and how the camera produces the image 310 and other images in the training images 250 relative to a ground truth of the surrounding environment. That is, the image character relates to aspects of the camera 126, such as lens distortion, a configuration of the camera system itself (e.g., FOV, reflecting mirrors), and other aspects that influence how the image is formed.

Figure 6:
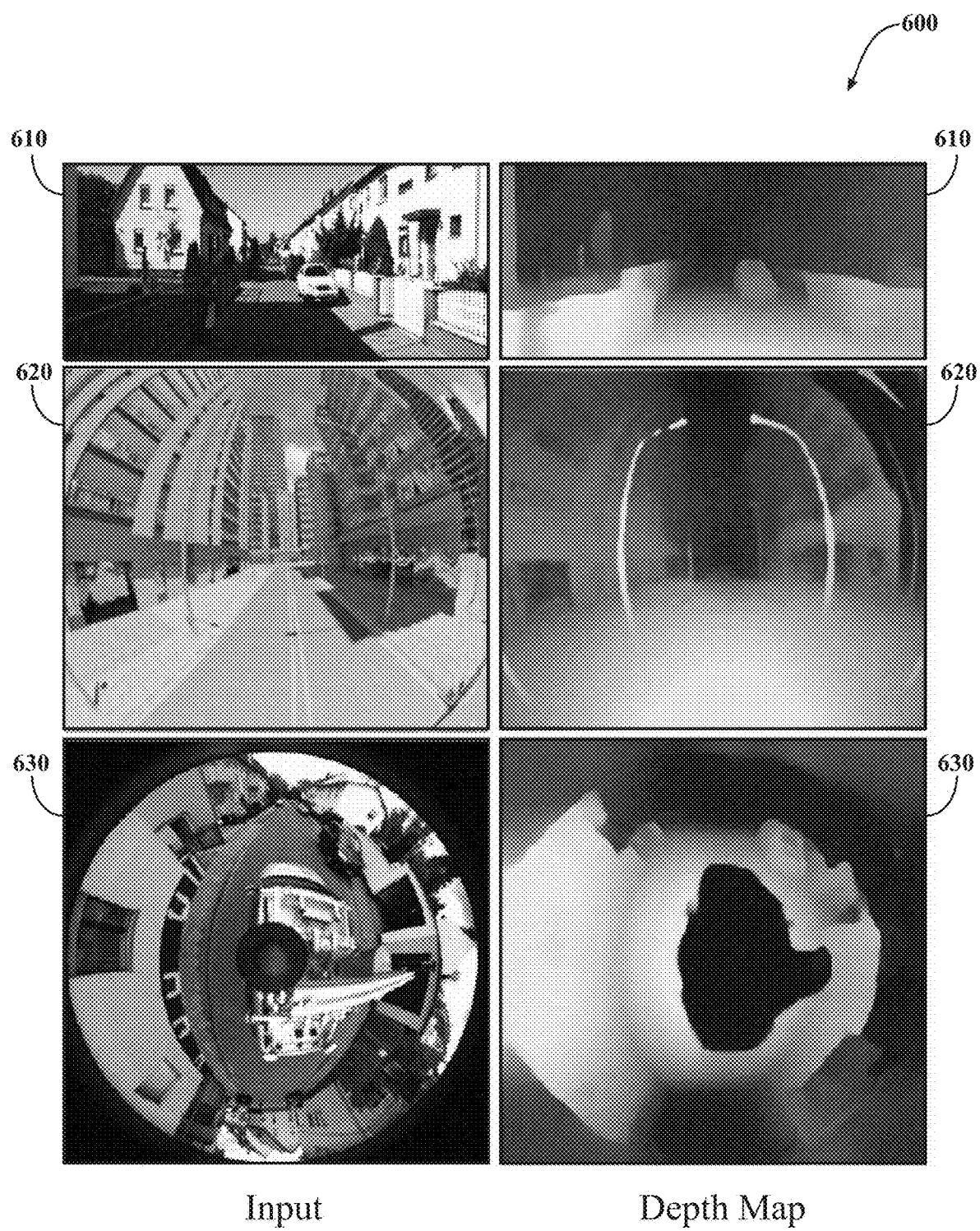
FIG. 6 shows several examples of images from different types of cameras and corresponding depth maps that may be derived therefrom.

By way of example, FIG. 6 illustrates three examples 600 of different types of images and resulting depth maps from different types of camera systems. As shown in FIG. 6, example 610 includes an input monocular image that is from a pinhole type of camera and a corresponding depth map. This type of camera is generally characterized by minimal distortion but may have a narrow field-of-view in relation to other camera types. Example 620 shows an example monocular image from a fisheye camera and a corresponding depth map. As shown, the fisheye camera includes an improved field-of-view but includes greater amounts of distortion around the perimeter of the image. As a further example, example 630 shows a monocular image from a catadioptric type of camera along with a corresponding depth map. The catadioptric camera exhibits an improved field-of-view by showing 360 degrees about the source, but is further characterized by an increased level of distortion in contrast to the pinhole example.

In any case, the ray surface network 270 provides ray surface(s) 350 that correspond to the image character of a source camera. In one or more approaches, the ray surface 350 may be comprised of a learned residual ray surface $\hat{Q}_r$ that is added to a fixed ray surface template $Q_0$ to form the ray surface 350 $\hat{Q}$. The depth system 170 may implement the ray surface template $Q_0$ along with the learned residual ray surface $\hat{Q}_r$ in order to facilitate difficulties with accurately learning the ray surface $\hat{Q}$. That is, randomly initializing the ray surface $\hat{Q}$ leads to greater difficulty in ultimately learning an accurate representation. As such, because the camera type may be known, the training module 230 may initialize the training by using the ray surface template $Q_0$ in combination with the learned residual ray surface $\hat{Q}_r$ to inject geometric priors into the learning framework. If no information is available about the source camera, then the training module 230 may, in or more approaches, provide the ray surface template $Q_0$ according to a "dummy" template based on a pinhole camera by lifting a plane at a fixed distance and normalizing a surface of the plane. Whichever approach is undertaken, the training module 230 includes instructions to initialize training with the ray surface template $Q_0$ and gradually introduce the learned ray surface residual $\hat{Q}_r$.

The training module 230 then uses the ray surface 350 $\hat{Q}$ to synthesize the image 360. In one or more arrangements, the training module 230 includes instructions to lift pixels to produce three-dimensional points using the ray surface 350, the depth map 330, and a camera offset. The training module 230 then projects the three-dimensional points onto a context image to synthesize the image 360. It should be appreciated that generating the ray surface 350, lifting the pixels, and projecting the points may be collectively referred to as the neural camera model herein. In any case, a further illustration of this process will now be made in relation to FIG. 7.

Figure 7:
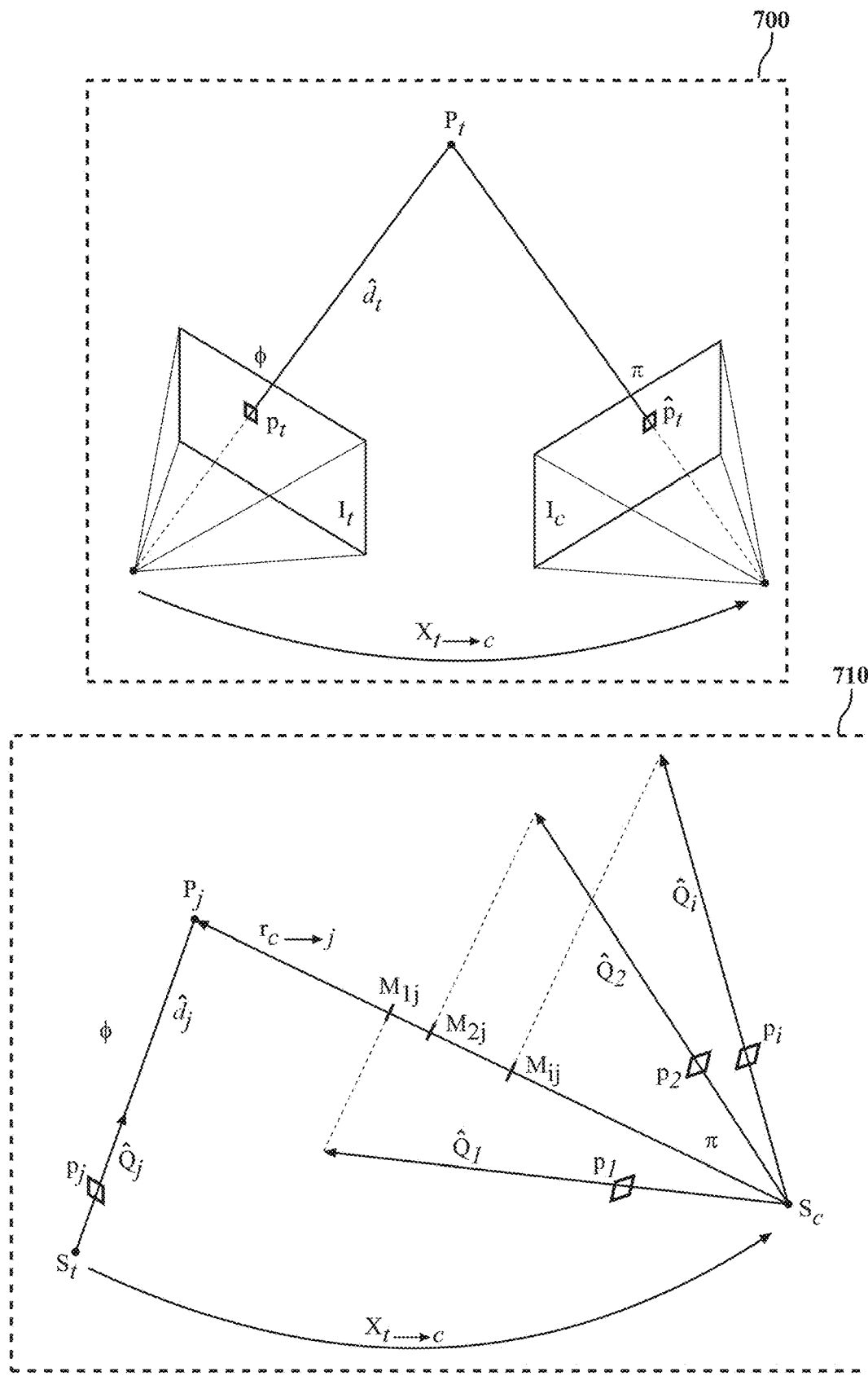
FIG. 7 illustrates one embodiment of a model for a pinhole camera and one embodiment of a model for a camera having an arbitrary type.

FIG. 7 illustrates a process of synthesizing an image in relation to a pinhole camera model as shown in example 700 and in relation to the neural camera model as implemented by the depth system 170. Example 700 illustrates the difference between the pinhole model 700 and the neural camera model 710 and further illustrates the distinctions through the correlations between the notations. In any case, in FIG. 7 illustrates lifting $\phi(p, d)=P$ and projecting $\pi(P)=p$ for a single pixel $p_j$ considering target image $I_t$ and context image $I_c$. Additionally, in FIG. 7, straight arrows represent unitary ray surface vectors $Q(p)$, which may not be drawn to scale to facilitate visualization. Additionally, as illustrated in FIG. 7, $p_1$ is associated to $p_j$.

To further define the notation applied in relation to FIG. 7, each pixel $p=[u, v]^T$, a camera offset/center is represented by $S(u, v)$ as a 3D point and a unitary ray surface vector $Q(u, v) \in \mathbb{R}^3$, with $D(u, v)$ representing scene depth along a ray. Additionally, the camera is the same for all points $S(u, v)=S, \forall(u, v)$. The present training architecture 300, as shown in FIG. 3 produces a ray surface estimate (i.e., ray surface 350), which is represented as $f_r=I \to Q$ according to the ray surface network 270 $\hat{Q}=f_r(I)$. Accordingly, the training module 230, in one or more arrangements, implements the lifting operation according to equation (1).

$$P(u,v)=S(u,v)+\hat{D}(u,v)\hat{Q}(u,v) \quad (1)$$

As noted in equation (1), the training module 230 scales a predicted ray vector $\hat{Q}(u, v)$ from the ray surface 350 by a predicted depth $\hat{D}(u, v)$ from the depth map 330, and further offsets this value by a camera offset/center $S(u, v)$, which is common to all the pixels. In one approach, the training module 230 assumes that the camera center coincidences with the origin of the reference coordinate system and, thus, sets $S(u, v)=[0, 0, 0]^T \forall u, v \in I$.

In any case, as a result of the lifting operation $P_t=\{P_j\}_{j=1}^{HW}$ produces pixels from $I_t$ as 3D points. To project the 3D points, the training module 230, in one approach, searches for each point $P_j$ to find a corresponding pixel $p_i \in I_c$ with ray surface vector $\hat{Q}_i=\hat{Q}_c(p_i)$ that most closely matches the direction of $P_j$ to the camera center $S_c$. This direction is indicated as $r_{c \to j}=P_j-S_c$. Thus, the training module 230 searches for $p_i^*$ such that:

$$p_i^*=\arg\max_{p_i \in I_c} \langle \hat{Q}_c(p_i), r_{c \to j} \rangle \quad (2)$$

To resolve this point from equation (2), in one or more approaches, the training module 230 may further include instructions to implement the argmax function as a softmax function. For example, to project 3D points $P_t$ onto context image $I_c$, the training module 230 is to find for each $P_j \in P_t$ a corresponding pixel $p_i \in I_c$ with ray surface $\hat{Q}_i$ closest to the direction $r_{c \to j}=P_j-S_c$. Accordingly, the training module 230 calculates, in one or more approaches, the dot product of each $r_{c \to j}$ with each ray vector $\hat{Q}_i$ to obtain a $(H \times W)^2$ tensor M with each coefficient $M_{ij}=\langle \hat{Q}_i, r_{c \to j} \rangle = M(p_i, P_j)$ representing a similarity between $\hat{Q}_j$ and $r_{c \to j}$. Accordingly, the neural camera model, as implemented via the training module 230 and the ray module 220 provides for:

$$i^*=\arg \max_i M(p_i, P_j) \quad (3)$$

However, to further make the operation differentiable, the training module 230 implements a softmax determination in place of the argmax with temperature $\tau$ to obtain the following implementation:

$$\tilde{M}(p_i, P_j) = \frac{\exp(M(p_i, P_j)/\tau)}{\left(\sum_i \exp(M(p_i, P_j)/\tau)\right)} \quad (4)$$

The training module 230 further anneals the temperature over a defined time so that the tensor becomes approximately one/hot for each pixel. The training module 230 may further acquire the 2D-3D association for projecting by multiplying with a vector of pixel indices. In this way, the training module 230 implements the projecting in a fully differentiable manner.

Furthermore, because rays at each pixel are independent and, thus, can point in any given direction, the training module implements the searching for the point as part of the projecting operation, in one or more arrangements, using a patch-based search that avoids searching over the entire context image. That is, the training module 230 may restrict the search involved in projecting the 3D points to a small h×w grid in the context image $I_c$ surrounding the (u, v) coordinates of the target pixel $p_t$. The training module 230 is capable of limiting the search space to a patch/grid about the target pixel since, in general, the motion of the vehicle 100 or source camera is small enough to produce correct associations within the patch. In further aspects, the training module 230 may implement further aspects to reduce memory requirements and improve performance, such as performing the search at half resolution, and then up-sampling the results to produce a pixel-wise estimate via, for example, interpolation. Consequently, the depth system 170 is able to synthesize the image 360 independently of the camera type for the images 250.

Continuing with FIG. 3 and the training module 230, in one or more arrangements, the training module 230 then uses the synthesized image 360 to generate a loss according to a loss function. In one or more embodiments, the loss function generates the loss as an appearance-based loss, such as a photometric loss. Thus, as one example, the loss function may calculate the photometric loss at the pixel level according to a structural similarity (SSIM) that may be combined with an L1 loss term. The structural similarity component and the L1 loss both operate on comparisons between the original target image 310 and the synthesized image 360 that is a regenerated form of the original image 310 according to the process explained above.

In addition to using the synthesized image 360, the training module 230 may further generate an additional component of the loss using the depth map 330. In one approach, the additional component is a depth smoothness loss. The depth smoothness component generally functions to regularize the depth in textureless image regions by penalizing high depth gradients in areas of low color gradients. While the loss function is discussed as including the noted components, in further aspects, the training module 230 may implement the loss function with only one component (e.g., the photometric loss) or with additional components (e.g., a velocity loss, etc.). In any case, the training module 230 uses the loss value 370 determined from at least the synthesized image 360 to train the depth model 260, the ray surface network 270, and the pose model 280 by backpropagating the loss value 370 and updating parameters of the noted models/network. In this way, the depth system 170 implements a self-supervised approach to monocular depth estimation that leverages a neural camera model to account for an arbitrary source of images as an input without explicit requirements for calibration and/or manual tuning according to the source camera.

Furthermore, the depth system 170 provides the depth map 330, in one or more approaches, to additional systems/modules in the vehicle 100 in order to control the operation of the modules and/or the vehicle 100 overall. In still further aspects, the training module 230 communicates the depth map 330 to a remote system (e.g., cloud-based system) as, for example, a mechanism for mapping the surrounding environment or for other purposes (e.g., traffic reporting, etc.). As one example, the training module 230 uses the depth map 330 to map locations of obstacles in the surrounding environment and plan a trajectory that safely navigates the obstacles. Thus, the training module 230, in one embodiment, uses the depth map 330, at least in part, to control the vehicle 100 to navigate through the surrounding environment.

In further aspects, the training module 230 conveys the depth map 330 to further internal systems/components of the vehicle 100, such as the autonomous driving module 160. By way of example, in one arrangement, the training module 230 acquires the depth map 330 and conveys the depth map 330 to the autonomous driving module 160 as an electronic input. In this way, the depth system 170 informs the autonomous driving module 160 of the depth estimates to improve situational awareness and planning of the module 160. As such, the module 160 may acquire the depth map 330 as a primary source of depth information for the surrounding environment or, in one approach, as a secondary source that verifies other means (e.g., LiDAR data). It should be appreciated that the autonomous driving module 160 is indicated as one example, and, in further arrangements, the training module 230 may provide the depth map 330 to the module 160 and other components in parallel.

Figure 8:
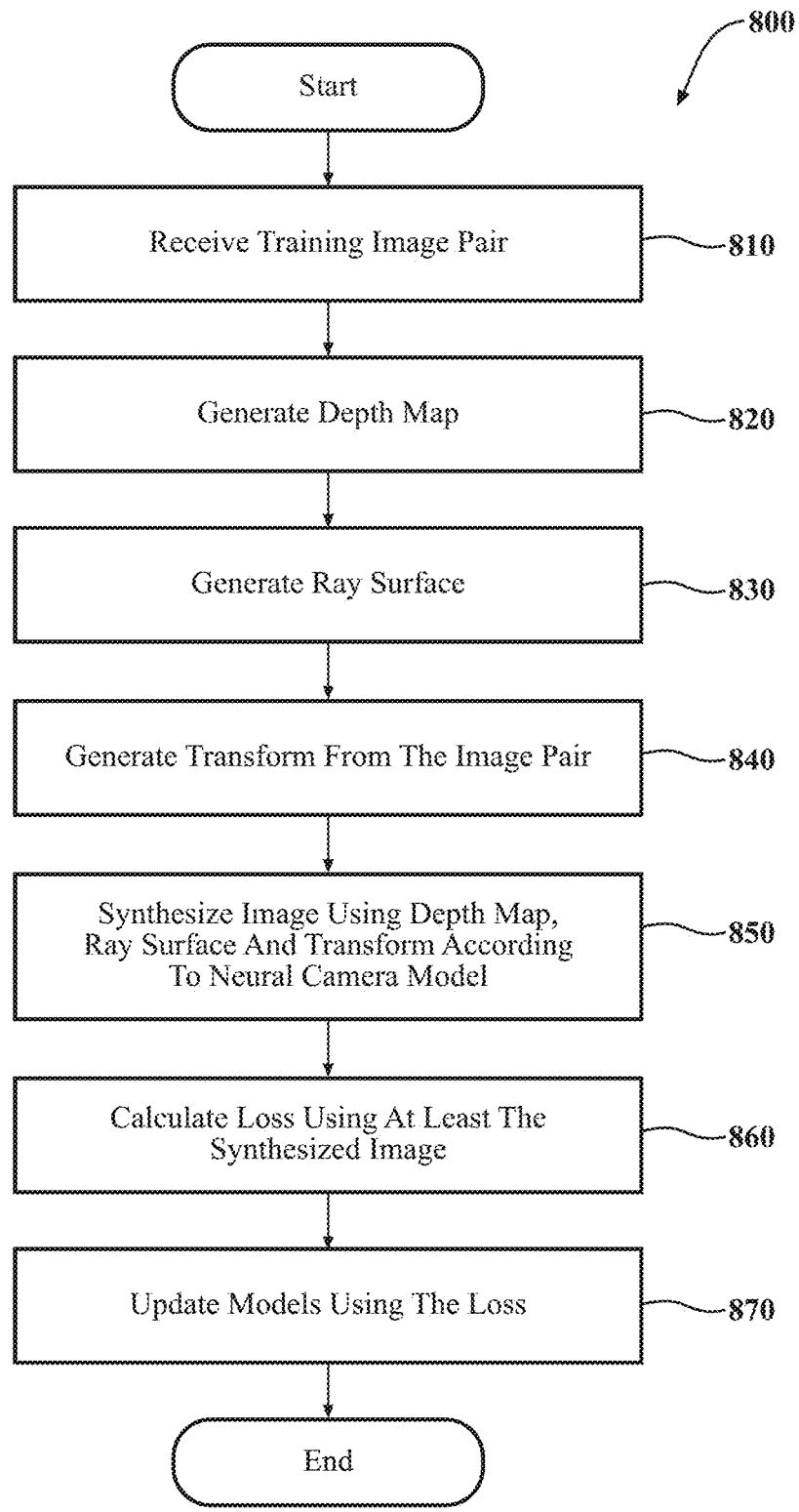
FIG. 8 illustrates a flowchart of one embodiment of a method associated with self-supervised training of a depth model using an arbitrary camera model.

Additional aspects of training a depth model using monocular images according to a neural camera model will be discussed in relation to FIG. 8. FIG. 8 illustrates a flowchart of a method 800 that is associated with improving depth estimates for monocular images using a neural camera model that is independent of a camera type. Method 800 will be discussed from the perspective of the depth system 170 of FIGS. 1-2. While method 800 is discussed in combination with the depth system 170, it should be appreciated that the method 800 is not limited to being implemented within the depth system 170 but is instead one example of a system that may implement the method 800.

At 810, the training module 230 acquires the training images 250. In general, the training images 250, as previously noted, include separate images from a monocular camera (e.g., camera 126) that form a video. Thus, an individual round of training for the depth model 260 includes two monocular images of a same scene from the video. The images may be consecutive but are generally separated by multiple intervening images in the video. This form of training is generally characterized as a self-supervised process that leverages a structure from motion (SfM) approach. In any case, the depth system 170 uses two images as input to the training architecture.

At 820, the training module 230 executes the depth model 260 over one of the images (e.g., target image $I_t$) of the pair to generate a depth map indicating depths associated with aspects represented in the image. Thus, after the training module 230 executes the depth model 260 to generate the depth map, the training module 230 may execute further training routines to advanced the training process.

At 830, the ray module 220 generates a ray surface using the ray surface network 270. As previously described, a ray surface approximates an image character of the monocular image provided as input. The image character generally describes the camera type from which the monocular image originates. Thus, the image character indicates at least aspects of the camera that influence how the image is generated, such as a format of the monocular image and lens distortion as produced by a camera having the camera type. Accordingly, the ray surface network 270 learns the camera type according to the image character to provide the ray surface.

The ray surface itself associates pixels within the monocular image with directions in an environment from which light that generates the pixels in the camera originate. In one or more approaches, the ray surface is comprised of a residual component and a fixed component. The ray surface network 270 learns the residual component by iteratively processing different images and updating through the disclosed training process, but the fixed component (also referred to as the template) is a geometric prior for the camera type.

At 840, the training module 230 generates the transform 340 using the pose model 280. As previously described, the transform 280 describes a change in position of the source camera between frames (i.e., 310 and 320). The training module 230 uses the transform 340 when generating the synthesized image 360.

At 850, the training module 230 creates the image 360. In one or more approaches, the training module 230 creates the image 360 by synthesizing the image 360 from at least the ray surface (e.g., 350) and a depth map (e.g., 330) associated with the monocular image (i.e., 310). As implemented by the training module 230, creating the synthesized image generally includes applying the neural camera model to the noted inputs to synthesize the image 360. The neural camera model implements various functions in combination with inputs, such as a lifting operation and a projection operation. The neural camera model functions to lift pixels from the depth map 330 to produce three-dimensional points using the ray surface and a camera offset. Further, the neural camera model projects the three-dimensional points onto a context image to create the synthesized image. The lifting and projecting operations will be discussed in greater detail subsequently along with FIG. 9. However, it should be appreciated that the neural camera model through the noted operations and by further implementing the ray surface network to learn the ray surfaces that are associated with source camera, permit the depth system 170 to train the depth model 260 and the pose model 280 independently of the source camera format/type.

At 860, the training module 230 calculates a loss according to a loss function. The loss characterizes an accuracy of the depth model 260 in producing the depth map. The loss may take different forms, such as a photometric loss, a reprojection loss, a combination of different losses, and so on. In any case, the training module 230 synthesizes the image 360 from the depth map 330, and the transform 340 via a neural camera model (i.e., the ray surface 350 in combination with the lifting and projecting operations). The synthesized image 360 then functions as a basis for determining at least a portion of the loss 370.

At 870, the training module 230 uses the loss to adapt the depth model 260. In one embodiment, adapting the depth model 260 generally involves changing weights within separate layers of the depth model 260. Thus, in at least one approach, the training module 230 changes weights to improve the generation of depth estimates for subsequent input images. Furthermore, the training module 230 may also train the pose model 280 and the ray surface network 270 using the same or similar losses. In this way, the depth system 170 implements a depth model to produce the depth estimates according to a self-supervised structure from motion (SfM) process.

Figure 9:
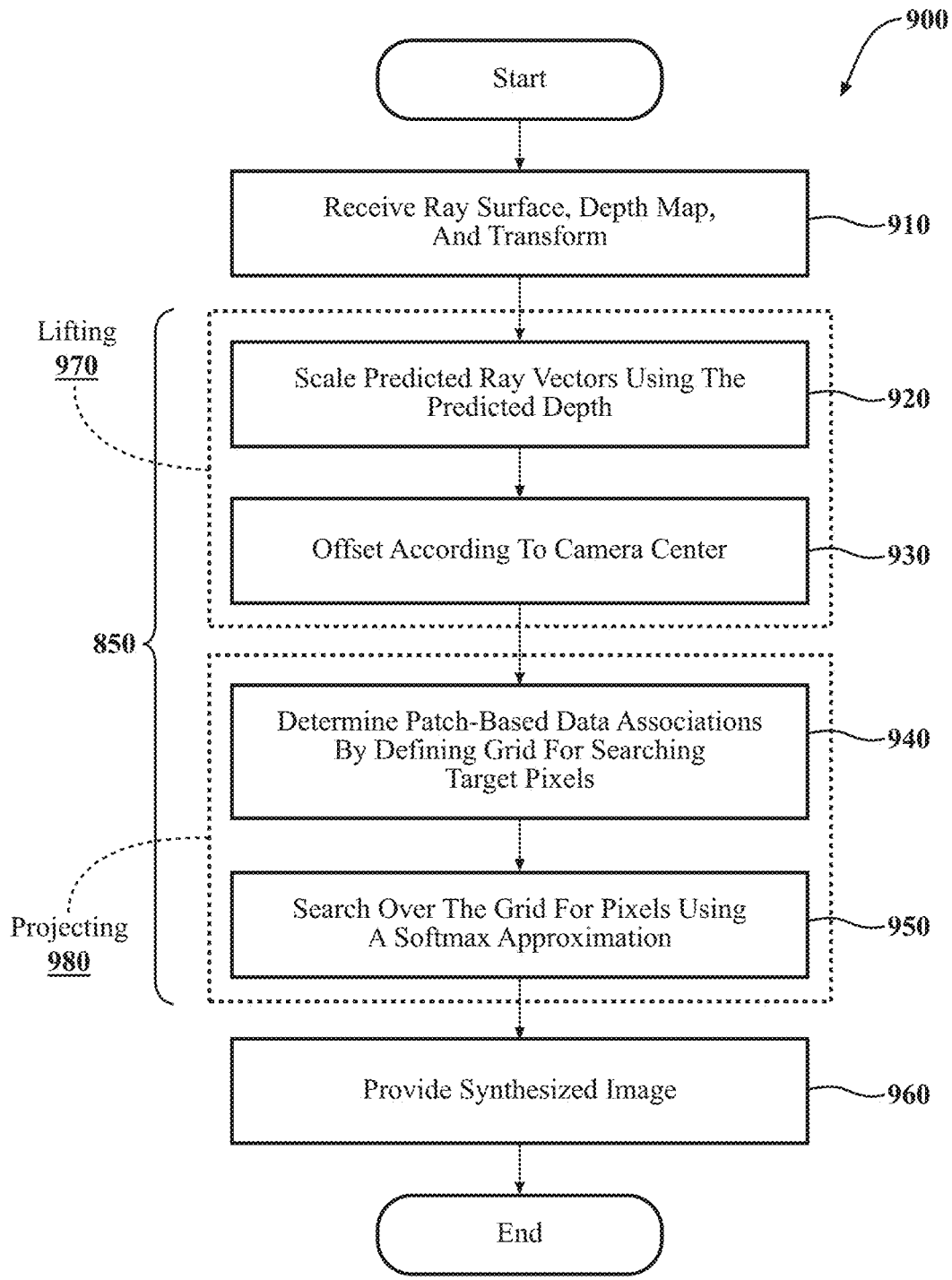
FIG. 9 illustrates a flowchart of one embodiment of a method associated with synthesizing an image using a ray surface.

Additional aspects of synthesizing the image 360 according to a neural camera model as noted at block 850 will be discussed in relation to FIG. 9. FIG. 9 illustrates a flowchart of a method 900 that is associated with synthesizing an image according to a ray surface. Method 900 will be discussed from the perspective of the depth system 170 of FIGS. 1-2. While method 900 is discussed in combination with the depth system 170, it should be appreciated that the method 900 is not limited to being implemented within the depth system 170 but is instead one example of a system that may implement the method 900.

At 910, the neural camera model receives data inputs for synthesizing an image. As shown, the neural camera model receives at least a ray surface, a depth map, and a transform (i.e., a rigid-body transformation) that are derived from a pair of training images.

At 920, the neural camera model scales predicted ray vectors from the ray surface using the depth map.

At 930, the neural camera model adjusts the predicted ray vectors according to the camera offset (i.e., camera center). The operations of 920 and 930 combine to form the lifting operation 970.

At 940, the neural camera model determines a patch-based data association for searching pixels in the synthesized image. In one approach, the neural camera model determines the associations by defining search grids for target pixels of the synthesized image according to coordinates of respective ones of the target pixels and a defined grid size. Thus, the model determines a grid having dimensions height×width that is a space lesser than the whole image. In one approach the grid may be 100×100 pixels or another suitable grid size. In any case, by using the grid to search the image, the neural camera model reduces the computational complexity of projecting the 3D points into pixels.

At 950, the neural camera model applies a softmax approximation with an annealing temperature to search over the respective search grids. Applying a softmax approximation to derive each pixel in the synthesized image generally includes identifying a predicted ray vector from the ray surface that corresponds with a direction associated with each of the three-dimensional points as defined relative to the camera offset. In this way, the neural camera model can identify pixels of the synthesized image. The operations of 940 and 950 combine to form the projecting operation 980.

At 960, the neural camera model provides the synthesized image as an output. Accordingly, integrating the neural camera model within a self-supervised monocular depth estimation framework improves the training of the associated models by providing independence from the source camera such that the depth system 170 can operate on arbitrary cameras without a need to perform complex calibrations.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the depth system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving module(s) 160 may control some or all of these vehicle systems 140 and, thus, may be partially or fully autonomous.

The processor(s) 110, the depth system 170, and/or the autonomous driving module(s) 160 can be operatively connected to communicate with the various vehicle systems 140 and/or individual components thereof. For example, returning to FIG. 1, the processor(s) 110, the depth system 170, and/or the autonomous driving module(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving module(s) 160 may control some or all of these vehicle systems 140.

The processor(s) 110, the depth system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the depth system 170, and/or the autonomous driving module(s) 160 can control the direction and/or speed of the vehicle 100. The processor(s) 110, the depth system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the depth system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof.

Accordingly, reference should be made to the following claims, rather than to the foregoing specification, as indicating the scope hereof.

What is claimed is:

1. A depth system for improving depth estimates for monocular images using a neural camera model that is independent of a camera type, comprising:
one or more processors;
a memory communicably coupled to the one or more processors and storing:
a ray module including instructions that, when executed by the one or more processors, cause the one or more processors to:
receive a monocular image from a pair of training images derived from a monocular video, and
generate, using a ray surface network, a ray surface that approximates an image character of the monocular image as produced by a camera with a defined type; and
a training module including instructions that, when executed by the one or more processors, cause the one or more processors to train a depth model by creating a synthesized image according to at least the ray surface and a depth map associated with the monocular image and using the synthesized image to derive a loss according to a loss function that updates at least the depth model, and the ray surface network, wherein the training module includes the instructions to train according to a self-supervised structure from motion (SfM) process.

2. The depth system of claim 1, wherein the training module includes instructions to create the synthesized image including instructions to apply the neural camera model by:
lifting pixels to produce three-dimensional points using the ray surface, the depth map, and a camera offset, and
projecting the three-dimensional points onto a context image to create the synthesized image.

3. The depth system of claim 2, wherein the training module includes instructions to lift the pixels including instructions to scale predicted ray vectors from the ray surface using the depth map and adjust the predicted ray vectors according to the camera offset that is an origin of a reference coordinate system.

4. The depth system of claim 2, wherein the training module includes instructions to project including instructions to apply a softmax approximation to derive each pixel in the synthesized image by identifying a predicted ray vector from the ray surface that corresponds with a direction associated with each of the three-dimensional points as defined relative to the camera offset, and
wherein the ray module includes instructions to generate the ray surface including instructions to learn the camera type to provide the ray surface as part of the neural camera model that approximates the camera type for a set of training data including the pair of training images.

5. The depth system of claim 2, wherein the training module includes instructions to project includes determining a patch-based data association for searching each pixel in the synthesized image by defining search grids for target pixels according to coordinates of respective ones of the target pixels and a defined grid size, and
wherein the training module includes instructions to project the three-dimensional points into the synthesized image includes applying a softmax approximation with an annealing temperature to search over the search grids.

6. The depth system of claim 1, wherein the ray surface is comprised of a residual component and a fixed component, wherein the residual component is learned by the ray surface network and the fixed component is a geometric prior for the camera type,
wherein the image character associated with the camera type includes at least a format of the monocular image and lens distortion, and
wherein the ray surface associates pixels within the monocular image with directions in an environment from which light that generates the pixels originate.

7. The depth system of claim 1, wherein the training module further includes instructions to provide the synthesized image as part of training a depth model for generating the depth estimates.

8. A non-transitory computer-readable medium for improving depth estimates for monocular images using a neural camera model that is independent of a camera type and including instructions that when executed by one or more processors cause the one or more processors to:
receive a monocular image from a pair of training images derived from a monocular video;
generate, using a ray surface network, a ray surface that approximates an image character of the monocular image as produced by a camera with a defined type; and
train a depth model by creating a synthesized image according to at least the ray surface and a depth map associated with the monocular image and using the synthesized image to derive a loss according to a loss function that updates at least the depth model, and the ray surface network, wherein the training occurs according to a self-supervised structure from motion (SfM) process.

9. The non-transitory computer-readable medium of claim 8, wherein the instructions to create the synthesized image include instructions to apply the neural camera model by:
lifting pixels to produce three-dimensional points using the ray surface, the depth map, and a camera offset, and
projecting the three-dimensional points onto a context image to create the synthesized image.

10. The non-transitory computer-readable medium of claim 9, wherein the instructions to lift the pixels include instructions to scale predicted ray vectors from the ray surface using the depth map and adjust the predicted ray vectors according to the camera offset that is an origin of a reference coordinate system.

11. The non-transitory computer-readable medium of claim 9, wherein the instructions to project include instructions to apply a softmax approximation to derive each pixel in the synthesized image by identifying a predicted ray vector from the ray surface that corresponds with a direction associated with each of the three-dimensional points as defined relative to the camera offset, and
wherein the instructions to generate the ray surface include instructions to learn the camera type to provide the ray surface as part of the neural camera model that approximates the camera type for a set of training data including the pair of training images.

12. The non-transitory computer-readable medium of claim 9, wherein the instructions to project include determining a patch-based data association for searching each pixel in the synthesized image by defining search grids for target pixels according to coordinates of respective ones of the target pixels and a defined grid size, and
wherein the instructions to project the three-dimensional points into the synthesized image includes applying a softmax approximation with an annealing temperature to search over the search grids.

13. A method of improving depth estimates for monocular images using a neural camera model that is independent of a camera type, comprising:
receiving a monocular image from a pair of training images derived from a monocular video;
generating, using a ray surface network, a ray surface that approximates an image character of the monocular image as produced by a camera having the camera type; and
training a depth model by creating a synthesized image according to at least the ray surface and a depth map associated with the monocular image and using the synthesized image to derive a loss according to a loss function that updates at least the depth model, and the ray surface network, wherein the training occurs according to a self-supervised structure from motion (SfM) process.

14. The method of claim 13, wherein creating the synthesized image includes applying the neural camera model by:
lifting pixels to produce three-dimensional points using the ray surface, the depth map, and a camera offset, and
projecting the three-dimensional points onto a context image to create the synthesized image.

15. The method of claim 14, wherein lifting the pixels includes scaling predicted ray vectors from the ray surface using the depth map and adjusting the predicted ray vectors according to the camera offset that is an origin of a reference coordinate system.

16. The method of claim 14, wherein projecting includes applying a softmax approximation to derive each pixel in the synthesized image by identifying a predicted ray vector from the ray surface that corresponds with a direction associated with each of the three-dimensional points as defined relative to the camera offset, and
wherein generating the ray surface includes learning the camera type to provide the ray surface as part of the neural camera model that approximates the camera type for a set of training data including the pair of training images.

17. The method of claim 14, wherein projecting includes determining a patch-based data association for searching each pixel in the synthesized image by defining search grids for target pixels according to coordinates of respective ones of the target pixels and a defined grid size, and
wherein projecting the three-dimensional points into the synthesized image includes applying a softmax approximation with an annealing temperature to search over the search grids.

18. The method of claim 13, wherein the ray surface is comprised of a residual component and a fixed component, wherein the residual component is learned by the ray surface network and the fixed component is a geometric prior for the camera type,
wherein the image character associated with the camera type includes at least a format of the monocular image and lens distortion, and
wherein the ray surface associates pixels within the monocular image with directions in an environment from which light that generates the pixels originate.

* * * * *